(12) United States Patent
Walt et al.

(10) Patent No.: US 8,338,776 B2
(45) Date of Patent: Dec. 25, 2012

(54) OPTICAL ARRAY DEVICE AND METHODS OF USE THEREOF FOR SCREENING, ANALYSIS AND MANIPULATION OF PARTICLES

(75) Inventors: David R. Walt, Medford, MA (US); Alexei R. Faustov, Somerville, MA (US)

(73) Assignee: Tufts University, Medford, MA (US)

( * ) Notice: Subject to any disclaimer, the term of this patent is extended or adjusted under 35 U.S.C. 154(b) by 261 days.

(21) Appl. No.: 12/664,340

(22) PCT Filed: Jun. 25, 2008

(86) PCT No.: PCT/US2008/007976
§ 371 (c)(1), (2), (4) Date: Oct. 13, 2010

(87) PCT Pub. No.: WO2009/002537
PCT Pub. Date: Dec. 31, 2008

(65) Prior Publication Data
US 2011/0089315 A1 Apr. 21, 2011

Related U.S. Application Data

(60) Provisional application No. 60/946,100, filed on Jun. 25, 2007.

(51) Int. Cl.
*H01S 1/00* (2006.01)
(52) U.S. Cl. ............ 250/251; 250/201.3; 359/566; 359/614; 436/172; 436/518
(58) Field of Classification Search .......... 250/251, 250/201.3; 359/566, 614; 436/172, 518
See application file for complete search history.

(56) References Cited

U.S. PATENT DOCUMENTS

| | | | |
|---|---|---|---|
| 4,893,886 A | 1/1990 | Ashkin et al. | |
| 5,254,477 A | 10/1993 | Walt | |
| 5,320,814 A | 6/1994 | Walt et al. | |
| 6,023,540 A | 2/2000 | Walt et al. | |
| 6,055,106 A | 4/2000 | Grier et al. | |
| 6,200,737 B1 | 3/2001 | Walt et al. | |
| 6,210,910 B1 | 4/2001 | Walt et al. | |
| 6,416,190 B1 | 7/2002 | Grier et al. | |
| 6,624,940 B1 * | 9/2003 | Grier et al. | 359/566 |
| 6,991,939 B2 * | 1/2006 | Walt et al. | 436/172 |
| 7,049,579 B2 * | 5/2006 | Ozkan et al. | 250/251 |
| 7,084,384 B2 * | 8/2006 | Proksch et al. | 250/201.3 |

(Continued)

OTHER PUBLICATIONS

Ashkin, "The Study of Cell by Optical Trapping and Manipulation of Living Cells Using Infrared Laser Beams", ASGSB Bulletin (1991), 4(2):133-46.

(Continued)

*Primary Examiner* — David A Vanore
(74) *Attorney, Agent, or Firm* — Bozicevic, Field & Francis LLP; Pamela J. Sherwood

(57) ABSTRACT

Methods and devices are provided for the trapping, including optical trapping; analysis; and selective manipulation of particles on an optical array. A device parcels a light source into many points of light transmitted through a microlens optical array and an Offner relay to an objective, where particles may be trapped. Preferably the individual points of light are individually controllable through a light controlling device. Optical properties of the particles may be determined by interrogation with light focused through the optical array. The particles may be manipulated by immobilizing or releasing specific particles, separating types of particles, etc.

18 Claims, 5 Drawing Sheets

U.S. PATENT DOCUMENTS

| | | | |
|---|---|---|---|
| 7,241,988 B2 * | 7/2007 | Gruber et al. | 250/251 |
| 7,402,131 B2 * | 7/2008 | Mueth et al. | 494/36 |
| 7,699,767 B2 * | 4/2010 | Mueth et al. | 494/36 |
| 7,718,953 B2 * | 5/2010 | Prather et al. | 250/251 |
| 2003/0032204 A1 * | 2/2003 | Walt et al. | 436/518 |
| 2004/0021949 A1 * | 2/2004 | Grier et al. | 359/614 |
| 2004/0089798 A1 * | 5/2004 | Gruber et al. | 250/251 |
| 2009/0032449 A1 * | 2/2009 | Mueth et al. | 210/94 |
| 2011/0089315 A1 * | 4/2011 | Walt et al. | 250/251 |

OTHER PUBLICATIONS

Dufresne; et al., "Computer-generated holographic optical tweezer arrays", Review of Scientific Instruments (2001), 72(3):1810-1816.

Dufresne; et al., "Optical tweezer arrays and optical substrates created with diffractive optics", Review of Scientific Instruments (1998), 69(5):1974-1977.

Fulwyler; et al., "Selective Photoreactions in a Programmable Array Microscope (PAM): Photoinitiated Polymerization, Photodecaging, and Photocromic Conversion", Cytometry (2005), Part A, 67A:68-75.

Lyons; et al., "Confinement and bistability in a tapered hemispherically lensed optical fiber trap", Appl. Phys. Lett. (1995), 66(13):1584-6.

Mio et al., "Design of a scanning laser optical trap for multiparticle manipulation", Review of Scientific Instruments (2000), 71(5):2196-2200.

Miyashita; et al., "Simulation of Magnetic Recording Process of Amorphous Continuous Media", IEICE Trans. Electron, (2000), E83-C(9):1505-1510.

Mogensen; et al., "Dynamic array generation and pattern formation for optical tweezers", Optics Communications (2000), 171:75-81.

Ogura; et al., "Optical manipulation of microscopic objects by means of vertical-cavity surface-emitting laser array sources", Applied Optics (2001), 40(30):5430-35.

Sasaki; et al., "Laser-Scanning Micromanipulation and Spatial Patterning of Fine Particles", Japanese Journal of Applied Physics (1991), 30(5B):L907-L909.

Sasaki; et al., "Pattern formation and flow control of fine particles by laser-scanning micromanipulation", Optics Letters (1991), 16(19):1463-5.

Taguchi; et al., "Dual-Beam Trapping Methods for an Object with Large Relative Refractive Index", Jpn. J. Appl. Phys. (2000), 39:L1302-L1304.

Tam; et al., "Parallel microparticle manipulation using an imaging fiber-bundle-based optical tweezer array and a digital micromirror device", Applied Physics Letter (2006), 89:194101, 3 pgs.

* cited by examiner

OPTICAL ARRAY DEVICE AND METHODS OF USE THEREOF FOR SCREENING, ANALYSIS AND MANIPULATION OF PARTICLES

GOVERNMENT RIGHTS

This invention was made with government support under EB003985 awarded by the National Institutes of Health. The government has certain rights in the invention.

BACKGROUND

An Optical Tweezers system for three-dimensional trapping utilizes a laser light brought into a tight focus by a high NA lens. The focused light provides both gradient and scattering forces applied to a small particle which index of refraction is higher than that of a medium it is immersed into. When the particle reaches a point where both forces compensate each other, optical trapping is observed.

It has been suggested that optical trapping, or tweezer systems could be applied to biological microparticles, for example see U.S. Pat. No. 6,416,190. Cell separation and phenotypic analysis are a rapidly growing area of biomedical and clinical development. Improved methods of separating a desired cell subset from a complex population permit the study and use of cells that have relatively uniform and defined characteristics. Cell separation is widely used in research, e.g. to determine the effect of a drug or treatment on a targeted cell population; investigation of biological pathways; isolation of transformed or otherwise modified cell populations; etc. One widely used method for cell analysis and separation is flow cytometry, where the cells can be detected by fluorescence or light scattering. However, there are significant disadvantages to the use of flow cytometry. Although a high degree of purity can be achieved, cells are processed in series, i.e. single file through the sorter. Even with high flow rates, it is time-consuming to isolate a sufficient number of cells for clinical applications, since several sorting cycles are required.

Conventional optical tweezer systems use a single laser beam to create a single trap, manipulating a particle at a time. But in order to trap and manipulate multiple particles, multiple beams of light must be used. Current optical tweezer techniques and methodology are not readily extended to create multiple beams, thereby limiting the throughput and potential use in many applications. The present invention provides a novel approach and methodology to create high-density arrays of optical traps.

Relevant Literature

U.S. Pat. No. 6,210,910 describes an optical fiber biosensor array comprising cell populations confined to microcavities. U.S. Pat. No. 6,200,737 is directed to photodeposition methods for fabricating a three-dimensional patterned polymer microstructure on solid substrates using unitary fiber optic arrays for light delivery. U.S. Pat. No. 6,023,540 provides a fiber optic sensor with encoded microspheres. U.S. Pat. No. 5,320,814 describes fiber optic array sensors, apparatus, and methods for concurrently visualizing and chemically detecting multiple analytes of interest in a fluid sample. Fluorescence intramolecular energy transfer conjugate compositions and detection methods are disclosed in U.S. Pat. No. 5,254,477.

Optical trapping is described, e.g. in U.S. Pat. No. 4,893,886, as a single-beam gradient force trap. This force trap consists of a strongly focused light beam which has a near Gaussian transverse intensity profile. The stabilizing effect on the trapped particle arises due to the combination of the radiation pressure scattering and gradient force components, which combine to give a locus of stable equilibrium near the focus of the laser beam. Thus, stabilizing the trapped particle occurs by strongly focusing the light. The majority of currently produced optical tweezer systems create a single or a few tweezers, moving a singular or a few particles at a time. Dual beams of light have been used as optical tweezers to manipulate microscopic objects and cells. Both single and dual-beam traps were used to levitate a microsphere from the bottom of a sample chamber (Ashkin (1991) ASGSB Bull. 4(2):133-46).

Taguchi et. al. (2000) *Jpn. J. Appl. Phys.* 39:L1302-L1304; and Taguchi et al. (2000) *IEICE Trans. Electron*. E83-C used single mode optical fibers to trap and manipulate microspheres and cells. Cells were also trapped using a single laser beam from an optical fiber inserted at an angle in a sample chamber. Manipulation of the cell was achieved by using a dual optical fiber arrangement. Lyons and Sonek (1995) *Appl. Phys. Lett.* 66:1584-6 used a dual single mode fiber optical trap with tapered ends coupled to laser diodes to trap dielectric particles. Axial and transverse trapping was exhibited. Sasaki et al. (1991) *Jpn. J. Appl. Phys.*, 30:L907-L909; and Sasaki et al. (1991) *Opt. Lett.* 16:1463-5 reported on a repetitive laser scanning method to manipulate and pattern multiple microparticles in solution. The particles were aligned by continuously scanning at 13 to 50 Hz by computer controlled galvano mirrors. Mio et al. (2000) *Rev. Sci. Instrum* 71:2196-2200 have reported a laser-scanning method to manipulate colloids and biological cells in solution. A single beam scanned at rates as high as 1200 Hz to trap multiple colloids simultaneously. In all the methods mentioned above, one trap was used.

Methods have been proposed for creating an array of traps. Dufresne et al. (1998); *Rev. Sci. Instrum.* 69:1974-1977; Dufresne et al. (2001) *Rev. Sci. Instrum.* 72:1810-1816; U.S. Pat. Nos. 6,055,106; and 6,416,190 disclose techniques for creating multiple optical tweezers using commercially available diffraction gratings as well as computer-generated holograms. The diffractive optical elements generate triangular and square tweezer arrays with up to 400 individual traps.

Ogura et al. (2001) *Appl. Opt.* 40:5430-35 propose a method for a trap array using multiple beams generated by a vertical-cavity surface emitting (VCSEL) array. Multiple particles were simultaneously captured and manipulated by using an 8×8 VCSEL-based tweezer array. Mogensen and Gluckstad (2000) *Opt. Commun.* 175:75-81 report a method of creating an optical tweezer array by using a phase-only liquid crystal Spatial Light Modulator (SLM) to encode an image directly in the phase component of a laser beam. This general phase contrast approach creates a low loss system to simultaneously manipulate multiple microparticles.

U.S. Pat. No. 6,991,939, issued Jan. 31, 2006, herein specifically incorporated by reference, described an optical fiber based system for particle manipulation, and embodiment of which is described by Tam et al. (2006) Appl. Phys. Lett. 89:194101.

SUMMARY OF THE INVENTION

Methods and devices are provided for the trapping and selective manipulation of particles, including small dielectric particles; cells and other biological particles; etc. on an optical array. The invention provides a powerful tool for moving, trapping, assembling, positioning, examining, and sorting single particles and cells. Such capabilities have a broad range of potential applications in the fields of diagnostics, drug discovery, therapeutics, and basic research.

In an optical device of the invention, a laser beam is used as a source of light. The laser or lasers is focused through one or more microlens arrays to generate an array of focused light beams, each capable of providing for optical trapping points. The focused spots are relayed by an Offner Triplet to a reflective SLM, e.g. a digital micromirror device (DMD), where individual beams of light are controlled separately. The DMD directs light to a light dump; or through collimator lens and objective—to a cell which contains a suspension of the particles of interest.

The particles of interest are brought into proximity with the array of focused light the objective. The optical properties of the examined particles, e.g. the presence of fluorescent moieties, may be determined by interrogation, for example with light focused through the optical array; from underneath the particles flowing plane by using an inverted microscope setup, etc., where a plurality of particles may be interrogated in parallel. The particles can be manipulated by optical trapping; immobilizing or releasing specific particles, separating types of particles, etc. Manipulation methods advantageously utilize information about optical properties to select the targeted particles. Methods are provided for actuating individual traps, e.g. in response to a characteristic of the trapped dielectric particles.

In one embodiment of the invention, laser light is coupled into the optical array to create an array of optical traps, or tweezers, providing a simple, straightforward technique to trap and manipulate a multitude of microparticles in a parallel fashion. The tweezer array is used to simultaneously capture, assemble, move, sort or direct multiple materials, cells or particles into desired spatial patterns for a variety of uses. This method is advantageous in that a large number of traps are created within a small area, and each trap is easily addressable, providing a method to selectively trap particular particles while simultaneously releasing unwanted ones. This method creates different spatial patterns of trapped particles or cells, providing tools for designing new types of assays such as examining interactions between different cell types, protein-protein interactions, and immunoassays.

In one embodiment of the invention, a device is provided that is suitable for optical trapping or photoactivation sorting of particles. The devices of the invention comprise at least one microlens array coupled to an Offner relay. The optical array may be contained within a sealed apparatus suitable for processing of cells for clinical purposes. Devices may also include fluidic systems, which may comprise pumping means, fluidic channels, vessels for input and output, etc.; light systems, e.g. a laser light source, devices for controlling light, e.g. micromirror device; and data detection and control systems, e.g. a light detecting system, a data processor.

DETAILED DESCRIPTION OF THE EMBODIMENTS

Figure 1:
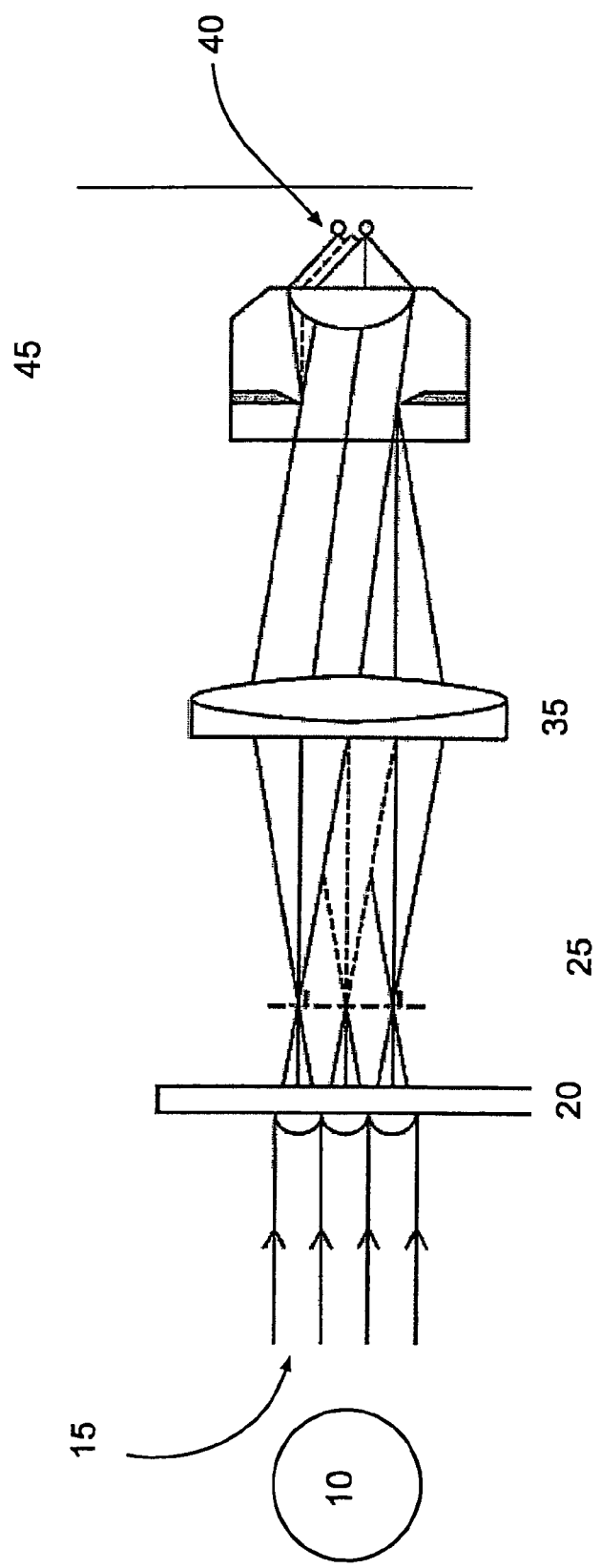
FIG. 1 illustrates a microlens array for particle trapping.

Devices are provided that are useful in the manipulation of populations of particles based on their optical properties. An optical array comprising one or more microlens arrays to generate an array of focused light beams, relayed by an Offner triplet to an SLM for controlling light. Particles of interest are retained through optical trapping. The particles are individually interrogated for optical properties, and can be selectively manipulated by optical trapping, and/or by photoactivation processes.

The optical array provides a matrix for the display of a population of particles, where the particles are distributed over the matrix of light beams, where (a) a single particle may be trapped on a beam, (b) two or more, usually not more than about 5 or more particles are trapped on a beam, or (c) a single particle may be trapped by two or more light beams. The particles may be distributed by introduced the trapping beams into a suspension of particles, by flowing a suspension of particles at the terminus of trapping beams, etc.

By interrogating the particles by sensors located underneath the particles flowing plane, information can be obtained about the specific optical properties of each particle, which optical properties correlate with various characteristics of the particle, e.g. the presence of fluorescent tags in combinatorial libraries, on the surface of cells, etc. The optical properties may be inherent to the particle, e.g. autofluorescence; or may be the result of specific labeling schemes. This optical information can be collected, and optionally is used to determine the targeting of particles for manipulation, e.g. retention, translocation, ablation, release, and the like. The trapped particles can also be viewed by through a separate system optical system, e.g. an inverted microscope, and the like.

Optical Trapping

In one embodiment of the invention, optical trapping is used to retain particles. An optical array parcels a light source through individual elements of the array, which elements focus a light beam to produce an optical trapping beam at the terminus. Preferably individual beams of light are separately controllable. Such an array, referred to herein as an optical tweezer array, may be formed by coupling a laser beam into an optical array. The numerical aperture (NA) of a lens is the half angle of the cone of light accepted by the lens, i.e., it determines how much light a lens will accept. Where the numerical aperture is greater than 0.7, the array can achieve three dimensional trapping, suspending a particle in suspension. For numerical apertures less than 0.7, the array can achieve two dimensional trapping, where particles are suspended against a barrier, e.g. the bottom of a sample chamber, cover slip, etc. The trapping device of the present invention is essentially three-dimensional.

Suitable optical arrays direct a laser beam through one or more microlens arrays to generate an array of focused light beams, each capable of providing for optical trapping points. In some embodiments of the invention, a single laser beam is directed through a single microlens array. In other embodiments, a plurality of microlens arrays are utilized to generate the array of focused beams.

In other embodiments two or more laser beams are introduced into the same microlens array. The beams may be oriented to have the same direction and pass the same microlens, producing a single focal point per microlens. Alternatively the beams have different propagation directions to create two or more focal spots by a microlens.

The focused beams are relayed through an Offner triplet to an addressable device for controlling light, e.g. a digital micromirror device (DMD), where individual beams of light are separately controlled. The DMD illumination/reflection geometry (FIG. 3) sets the upper limit for the system NA: NA<sin 12=0.21 (where 12 is the tilt angle for a micromirror). The size of the DMD micromirror limits the diameter of a focused light and thus the lower limit for NA is set: NA=1.22× (wavelength)/Airy_Disk=1.22×(1.070 um)/13 um=0.1 So, for a 1070 nm laser and +/−12 tilt DMD, the NA of the system is limited to: 0.1<NA<0.21. The NA is constant throughout the system—it is the same for the microlens array, Offner relay, DMD and Collimator. The microlens spacing (pitch) is defined by the DMD micromirror pitch. In case of a 1:1 relay the microlens pitch should be a product of an integer (1, 2, 3, . . . ) and the DMD pitch (13.68 microns). For diffraction-limited operation the size of a microlens should be dozens of wavelengths of laser illumination. The microscope objective characteristics should also be considered for system design. For Olympus objective the field number (FN is the size of the image the infinity corrected objective forms when used with a 180 mm tube lens) is 26.5 mm. The DMD active area width is 10.5 mm approximately. It means that in order to utilize the whole DMD area one should decrease the focal length of a tube lens (which in the text we call Collimator) by a factor (10.5/26.5)~0.4. So, the collimator lens should be 180 mm*0.4=72 mm. The objective pupil diameter is: pupil=2× NA×objective_focal_length=2×1.3×(180/40×)=11.7 mm for our objective. So, for a 72 mm collimator to fill the pupil of an objective the following NA should be taken: NA=(pupil/2)/ focal_length=(11.7/2)/72=0.081. But this is less than the lower limit for the NA (0.1<NA<0.21), so we either have to overfill an objective pupil (choosing lower system NA), or overfilling objective pupil (choosing bigger system NA). On the other hand we can decrease the Collimator focal length—but then less DMD active area will be utilized. We took NA=0.1 and overfilled the objective pupil. System transmission in case of uniform pupil illumination is decreased by the factor $(0.081/0.1)^2=0.66$.

The beams are directed from the addressable device to a light dump; or through a collimator lens and objective to a cell containing a suspension of the particles of interest The focused beam of light provides radiation fields and forces for optical trapping. Particles in proximity to the terminus of the beam are retained while the radiation fields and forces is maintained, and can be selectively released by dropping the radiation fields and forces. This method can also be used for transferring the particles from one location to another, as well as suspending a particle for measurement. Optical traps are useful for confining, isolating, translating and manipulating one or a selected group of particles in a population. The optical tweezer array may be observed by using a standard inverted microscope arrangement.

A device that controls the transmission of laser light through the objective, and therefore into the suspension of particles, is preferably used, such that an individual trap in the tweezer array can be selectively turned off or on. This capability allows parallel manipulation of individual objects in the array. As a result, the array can trap or release any selected object, spatially move objects to different traps in the array, rotate objects at a controlled speed, and assemble different micro- and nanostructures.

A single trapping beam may be used to trap a particle, or multiple particles. Larger particles may be trapped with multiple beams, or may be trapped with a single beam, where there may be some steric hindrance between adjacent particles. The use of multiple beams also provides the ability to rotate individual particles to a preferred orientation, and a particle can be moved by turning on and off successive beams.

An array of particles trapped by the tweezer array can be simultaneously interrogated using different wavelengths. For example, cells that produce fluorescent signals, e.g. expressing GFP, comprising labeled antibodies bound to cell surface markers, etc., can be trapped with infrared or near infrared laser light, while light at visible wavelengths can be used for excitation and emission measurements. Cells that produce high fluorescence signals can be identified, and they can then be sorted by turning off traps containing low fluorescence cells, thereby releasing them. At the same time, traps corresponding to the desired cells remain on, holding the cells stationary while the unwanted cells flow away. Alternatively, traps that contain the desired cells can be turned off, allowing the desired cells to flow and be collected for analysis while the undesired cells remain trapped. Using such an approach provides a parallel sorting technique of a multitude of microparticles.

By providing a method to create an optical tweezer array where each trap can be controlled, applications such as sorting and screening microscopic objects can be dramatically improved. Although current flow cytometry technologies provide high screening and sorting speeds, they are based on interrogating a single object or cell at a time. The tweezer array provides a parallel screening process, with much higher screening and sorting speeds. The tweezer array can be used to sort any given object or cell population to an unlimited number of groups because the cells are held and can be interrogated by multiple excitation/emission wavelengths over long periods of time (seconds to hours), unlike currently used technologies such as FACS (fluorescence activated cell sorter) which are limited in the number of wavelengths, as the particles must be interrogated while they transit through the laser beam. The tweezer array provides a means to monitor responses from many individual trapped cells or objects over time, providing new information about the kinetics of complex cellular or biochemical processes that cannot be obtained using current technologies. The tweezer array can also have the ability to selectively ablate trapped cells by appropriately altering the wavelength of the laser.

In addition to sorting and screening applications, a tweezer array can be used for clinical diagnostics applications, e.g. blood cell diagnostics; detection of cancer cells and ablation, or separation from normal cells; bone marrow transplantation applications; personalized or tailored cancer treatment; monitoring AIDS patients; monitoring organ transplant patients for rejection; isolating fetal cells from the mother's circulating blood; identifying infectious bacteria in blood or urine and determination of therapeutically effective antibiotics, and the like.

Additional tweezer array applications include chemical and biological sensor arrays where sensing particles or cells are held while solutions flow past the arrays. Such arrays can be used for various sensing applications, including screening drugs (drug discovery), testing clinical or environmental samples, etc. Particles may comprise a reactive or binding moiety, e.g. nucleic acids; antibodies; metal binding moieties; carbohydrate groups; polypeptides, e.g. receptors, ligands, etc.

Other uses include stem cell technologies, manipulation of biological materials, manipulation of nanoparticles, assembling of nano- and microparticles, and fabrication of micro- and nanostructures. Another application area is in combinatorial chemistry and biology. In this approach, combinatorial bead or cell libraries are prepared and then trapped in the tweezer array. Test solutions containing, for example, fluorescently-labeled biological receptors are passed over the trapped beads or cells. Particles that bind the receptor would signify binding by increasing their fluorescence intensity. Such beads could be held and all other beads released or vice versa.

Optical Array and Device

An optical array of the present invention comprises a microlens array, which may include at least 10, at least 100, at least 1000, at least 10,000 or more lenses, and usually not more than about 100,000 lenses. Each lens will have a numerical aperture of from about 0.05 to 0.21, and will have a diameter of from about 50 to about 250 microns. Materials for fabricating the array include various glasses, quartzes and the like, including, without limitation, fused Silica, Silicon or Pyrex (BF33). Such arrays are readily fabricated to order.

Where the optical array provides for optical trapping, it is desirable to provide a light focusing element, such that a light beam transmitted through the fiber will be focused and can provide sufficient radiation fields and forces to optically trap a cell. Laser diodes alone produce a beam that is divergent and astigmatic. In case of a laser diode assembly using multiple emitters, the small dimension of the emitters causes a very large divergence of the beam emitted therefrom. There exist different kinds of optics for collimating a laser diode bar or array. Examples of such optics are ordinary cylindrical fiber lenses, ball lenses, aspherical fiber lenses, photothermally generated lens arrays and holographic or binary diffractive optics.

The matrix, or array or focused beams emitted from the microlens array is relayed through an Offner Relay. The Offner relay is comprises two nearly concentric spherical mirrors, and relays images at 1:1 magnification with very high resolution and low distortion. The two mirrors of the Offner relay are aligned precisely with respect to each other and the object/image points.

The Offner relay directs light to an individually addressable array, e.g. a digital micromirror device, or DMD. Alternatively a microhole array is used. DMD chips contain an array of electrostatically actuated tiltable aluminum micromirrors that each flip through an angle of plus or minus ten degrees in response to the state of an underlying CMOS memory cell. Such devices are well known and commercially available, for example see Hornbeck, U.S. Pat. Nos. 5,018,256; 5,216,537; and 5,583,688, herein incorporated by reference. The geometry may be designed to provide a 1 to 1 correspondence between mirrors and beams in the array. Alternatively, multiple adjacent mirrors may be illuminated by a single beam.

A DMD chip is a pixelated, micromechanical SLM formed monolithically on a silicon substrate using a standard CMOS process. The mirror structures are fabricated after the completion of the CMOS process flow, e.g. from a highly reflective aluminum alloy. Each mirror is suspended over an air gap by two thin, torsion hinges supported by posts that electrically are connected to an underlying bus.

The micromirrors are arranged in an x-y array, and the chip also contains row drivers, column drivers and timing circuitry. The addressing circuitry under each mirror pixel is a memory cell that divides two electrodes under the mirror with complementary voltages. The electrodes are arrayed on opposite sides of the rotational axis that turns through the torsion bar attachments. Depending on the state of the SRAM cell the mirror is electrostatically attracted by a combination of the bias and address voltages to one of the other address electrodes. The mirror rotates until its tip touches on a landing electrode fabricated from the same level of metal as the electrode. The electrode is held to the same potential as the mirror.

A mirror rotated to the on position steers the incoming light towards Collimator and objective which form an optical trap in the cell. When the mirror is rotated to the off position, the reflected light is directed to dump, and does not enter the cell, so the particles are not trapped initially, or trapped particles are released.

Typically the DMD chip will transmit the trapping beams through a Collimator lens and objective, wherein the particles are trapped at the focal point below the objective, e.g. a suspension, a flowing suspension, a suspension in a microfluidic chamber, etc.

A light source will be provided to generate the trapping beams, where the light source is a laser beam or other very high intensity light sources capable of applying the necessary forces needed to carry out the optical trapping effect needed to manipulate a particle. The light source may provide for continuous wave or pulsed wave light. For optical trapping, in some embodiments a pulsed wave is selected, such that the light is pulsed at a rate where the particles are not released between pulses. The wavelength of light is selected based on the specific requirements of the sample to be analyzed, preferable where the absorption coefficient of the sample is sufficiently low to prevent damage to the sample (unless the sample is to be intentionally ablated with the light source).

For optical trapping, any wavelength in the visible and infrared and near infrared (1.070 µm) can be used. For trapping of cells and other biological material, it is preferable to use wavelengths in the infrared/near infrared range. This has the benefit of allowing the use of the visible range for interrogation, without interference of the trapping light, and because of lower absorption by cells, which minimizes cellular damage. Preferably a wavelength is selected such that the light is not significantly absorbed by sample, to avoid damaging the sample. Trapping forces required for individual particles range from about 5 mW to about 100 mW, depending on the size of the particle.

For both optical trapping and photoactivation trapping, the methods and devices of the invention will utilize a light system for collecting information about the optical properties of the trapped particles. For optical trapping devices, two light sources may be used in parallel; a laser or other high intensity light source to provide the optical trapping, and a broad band white light source, e.g. an arc lamp, mercury or xenon light source, etc., for the interrogation of the trapped particles. Alternatively, the trapping light source may also be used for interrogation, at a different wavelength, where two or more wavelengths are launched down the fiber for trapping an interrogation. For photoactivation methods, only a single light source is required.

A variety of configurations may be used in the light sources. For interrogation, the light source may be delivered at the distal terminus, where a detector may be located also at the distal end, or may be located at the proximal end. Alternatively, the light source for interrogation may be operably connected to the proximal end of the array, where detection can be at the distal or the proximal terminus. For example, a light source and detectors may be located underneath the trapped cells at the distal terminus of the fiber.

The optical array may be permanently or removably attached to a detector and to a light source for interrogation. The detector may comprise one or more lenses for focusing and enhancement of an optical signal transmitted along the optical array. The detector may additionally comprise a device for transforming the optical signal into a digital or analog electrical signal. Preferred detectors include phototubes (photomultipliers), diode arrays, or charge coupled devices (CCDs). A CCD (or other) camera may be focused at the proximal terminus to simultaneously read signals from all of the optical array while permitting individual evaluation of the signal from each fiber or conduit, or group of fibers and conduits.

For example, light from a suitable lamp can be collimated by a condensing lens, passed through an excitation filter, reflected by a dichroic mirror, and focused onto the proximal end of an imaging fiber with a microscope objective. A neutral density filter may be employed for adjustment of excitation light intensity. The imaging fiber is precisely positioned to transmit excitation light to the optical fiber array at the distal terminus. The emitted fluorescence light from the cells is returned through the fiber, through a dichroic mirror, filtered through an emission filter, and detected by a suitable detector, for example a charge coupled device (CCD) camera. A magnification lens may be employed if necessary. An alternative method for detection positions the detection optics at the distal (far) end of the fiber, with the detector focused on the fiber surface. Appropriate filters and lenses could be used to select light at emission wavelength.

Information gathered from the particles is input to a computer, or data processing element. Data gathering by the computer consists of the collection of emitted light from the cells, generally converted to a digital signal. Microprocessors can also serve to compute the selection of particles for manipulation, for example by calculating the background levels of a fluorescent signal, calculating which particles exceed the background, and targeting specific particles. The microprocessor may also collect and analyze data from fluorescence readings in order to plot the distribution of cell surface phenotypes, and the like.

Devices

FIG. 1 depicts a device for optical trapping, where a light source 10 provides collimated light 15 which is incident on a microlens array 20 to provide focal points 25. The focal points are directed towards a telecentric collimator lens 35 and a microscope objective 45, trapping particles 40 or to the dump.

Figure 2:
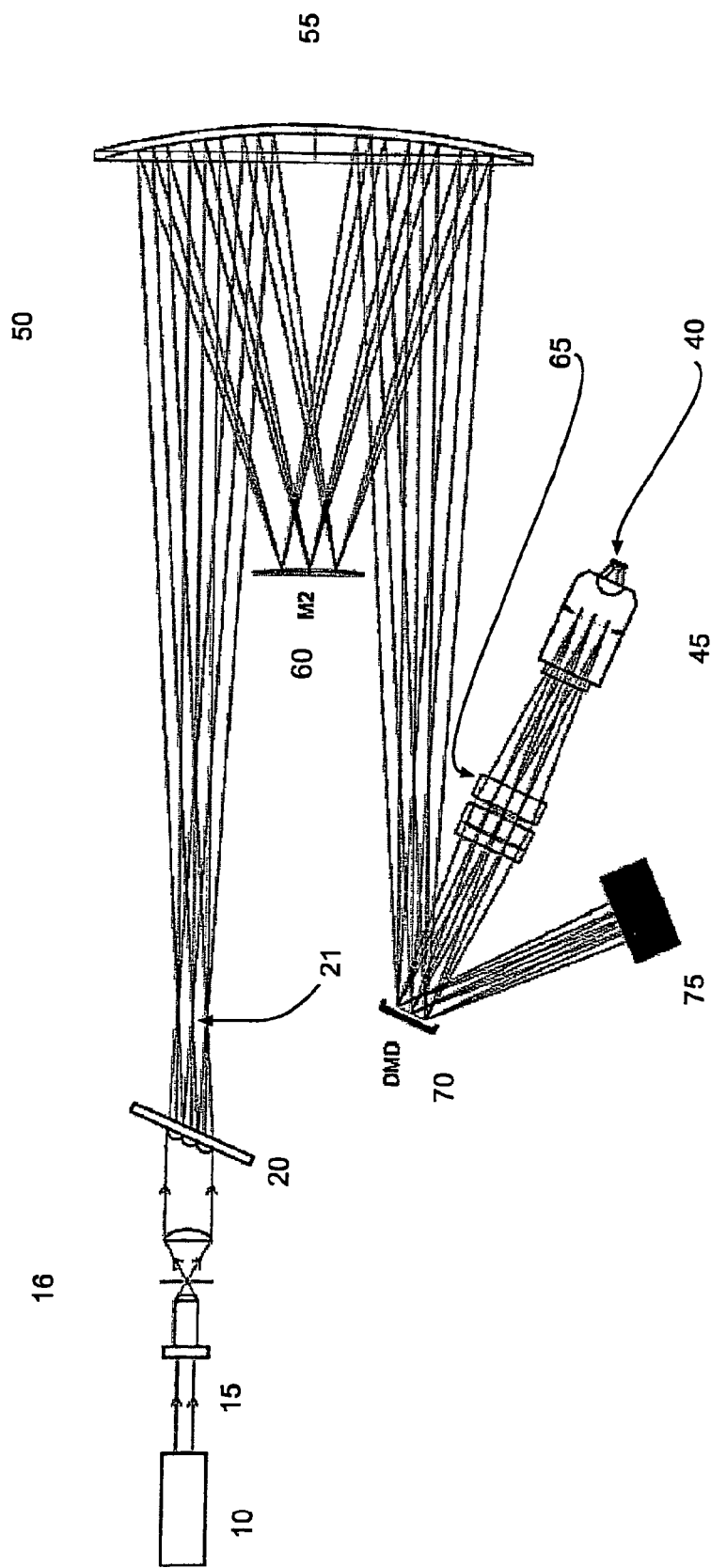
FIG. 2 illustrates an optical array with microlens array and Offner relay. The laser beam (1064 nm) is expanded by a telescope and illuminates a microlens array. Note that its normal is not parallel the optical axis. To decrease aberrations caused by this geometry, the lenses need to have elliptical shape. The focal points formed are relayed by an Offner Triplet onto a DMD which directs the light towards trapping optics or dump it. We installed a dichroic mirror between the collimator and the objective, steering the trapping IR light upwards. We can say that our system is based upon an inverted microscope in which the trapping pencils of light are switched on and off by a DMD.

As shown in FIG. 2, the improvements provided in the present invention provide for improved optical trapping means to capture, hold, and release a selected particle by a three-dimensional restrictive force. A light source 10 provides collimated light 15 which is expanded through a beam expander 16 which is incident on a microlens array 20 to provide focal points 21. The focal points are relayed by an Offner Relay 50 between lenses M1 55 and M2 60 onto a DMD 70 which micromirrors direct light towards a telecentric collimator lens 65 and a microscope objective 45, trapping particles 40, or alternatively are directed to a beam dump 75.

Figure 3:
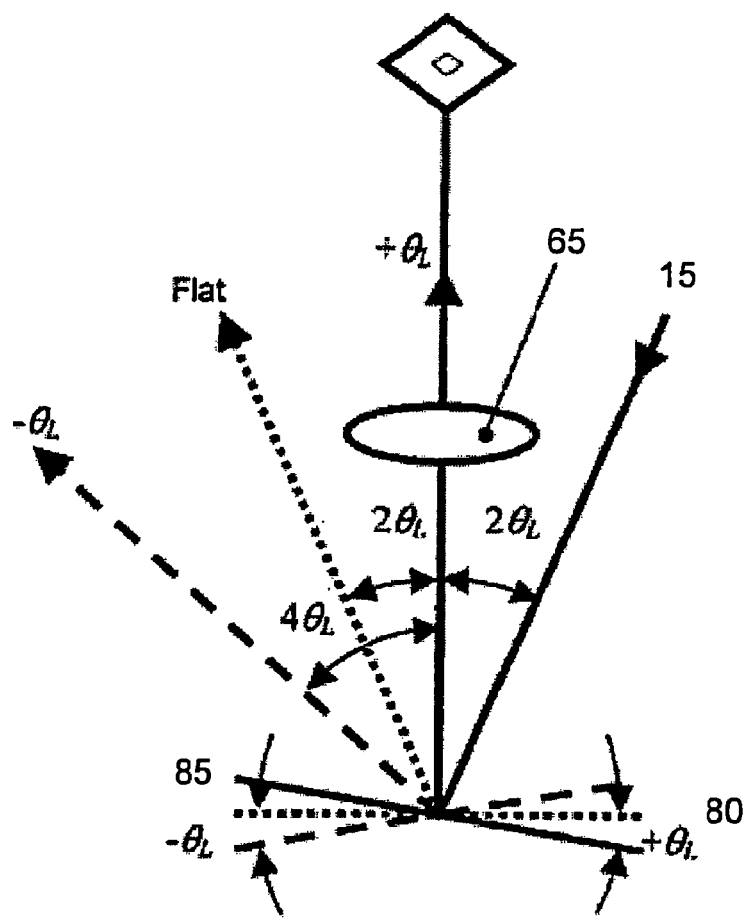
FIG. 3 is a schematic of DMD illumination/reflection geometry.
Figure 4:
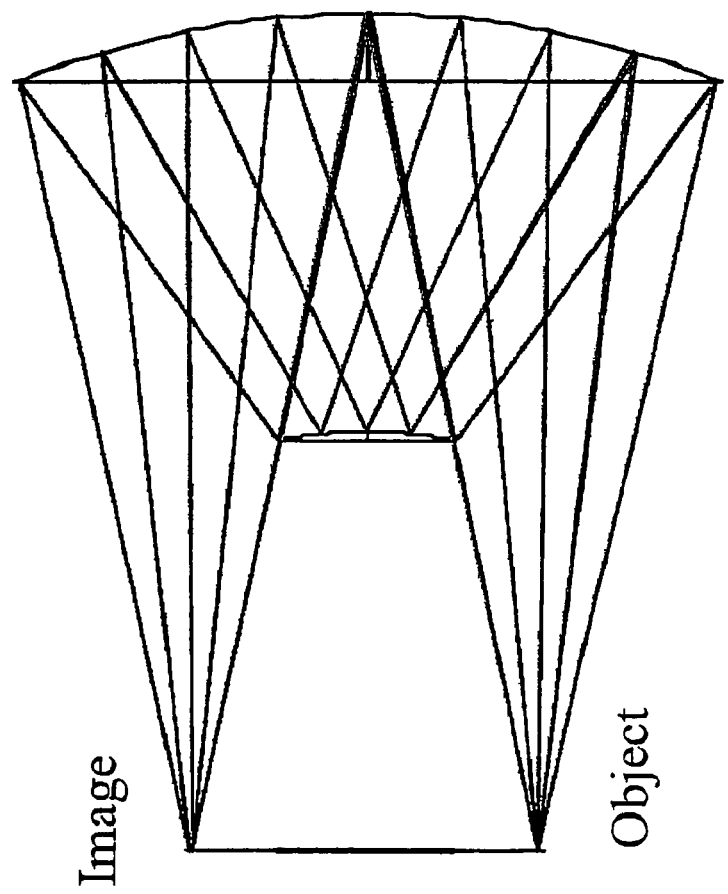
FIG. 4 is a schematic of an Offner triplet. Because the microlenses are supposed to be uniform and illuminated by a uniform collimated light, the chief rays of the light pencils they form, are parallel to each other, and the same is true for the pencils incident on the DMD chip. It means that we need to employ a double (or both sides) telecentric system as a relay. An Offner Triplet reflective relay was chosen, which consists of two concentric spherical mirrors. It is compact, achromatic, double telecentric and presents a diffraction-limited operation for 0.1 NA. The Offner triplet relays the focal points formed by microlens array onto a DMD.
Figure 5:
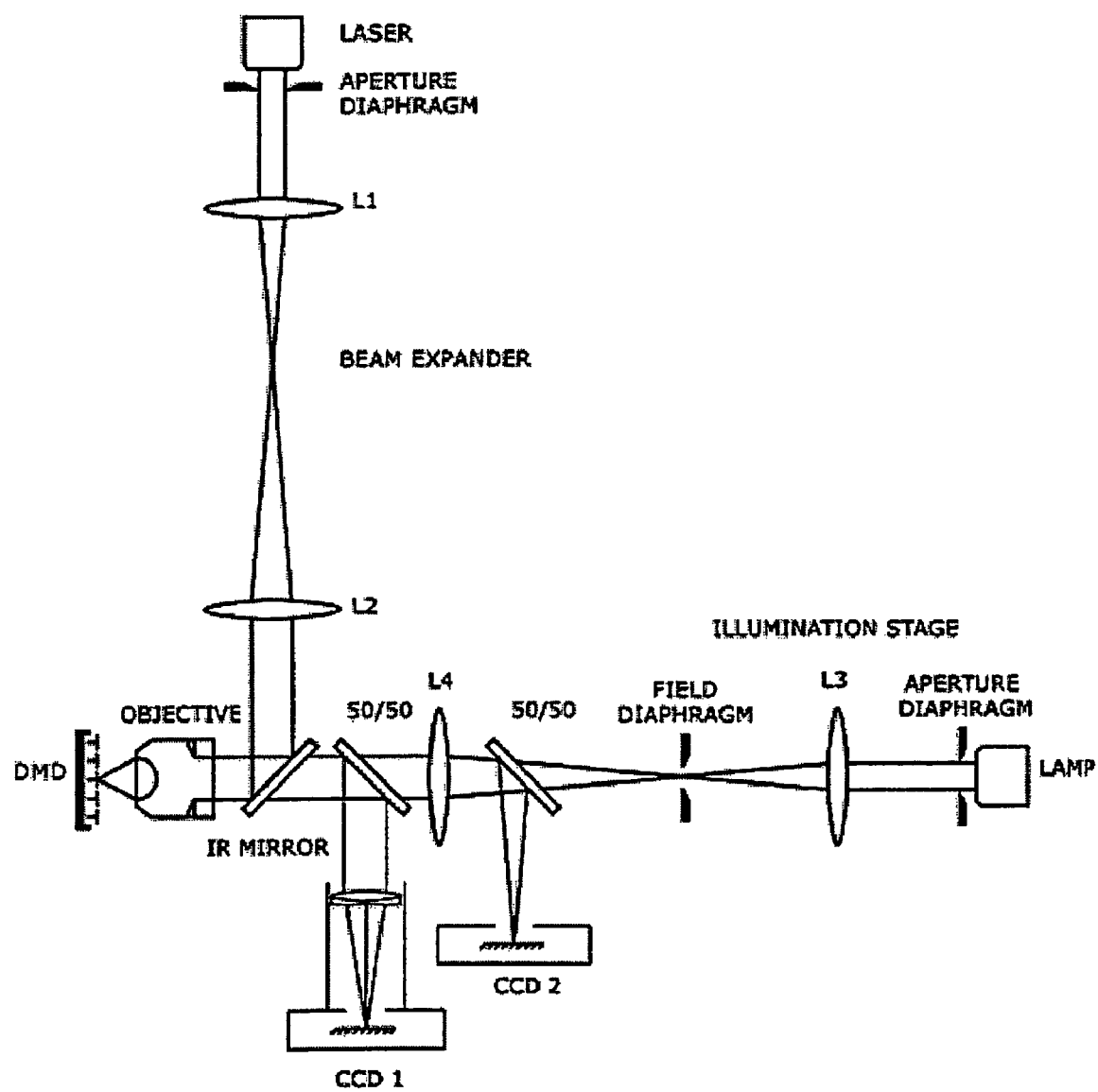
FIG. 5. The power levels the DMD mirrors are able to tolerate were tested. The IR light is focused onto DMD surface by a 0.2 10× OFR objective. The laser light passes a beam expander and is directed into the objective by a dichroic mirror. The focusing is observed on a CCD1 camera. Because of achromatism another CCD was used in visible range (CCD2) to check the surface state of the DMD tiles. The illumination for this was provided by a standard illumination stage (Koeler). The power meter (Newport 1815C) was placed head right in front of objective and then brought the DMD into focus. The power level was safely increased up to 30 mw. Permanent damage was caused with the power levels over 40 mW. The system transmission without DMD could not be better than 0.3. Assuming the DMD power transmission is 0.5, it can be concluded that the system transmission is 0.15. About 3 mW of IR power is needed for trapping, so 3/0.15=20 mW is needed at the DMD input. This power level is safe for the DMD.

FIG. 3 is a schematic of DMD illumination/reflection geometry. A beam of collimated light 15 is reflected by a DMD micromirror 80. The beam is reflected at different angles depending on the angle 85 of the mirror. At the appropriate angle the light is directed through a lens 65.

In one embodiment a separation device is provided, which includes the optical array. The device assembly may include the array, optionally within a sealed container, and may further include a sample vessel in fluid communication with a flow cell comprising an optical array in which the particles are exposed to light fields and forces, optionally in fluid communication with a collection vessel and a pumping means. The particles may be recirculated over the flow path.

The device may comprise a light detecting element, which receives emitted light from particles trapped on the array. It will be understood by those of skill in the art that the placement of the device in the figure is arbitrary, as a number of configurations for the light detection system are possible, as discussed herein. Signals from the light detection element are usually provided to a data processing element, which data processing element may compile information, and may also control the light controlling device.

Fluidic devices may comprise integrated channels for the flow of fluids and reactants within the device, where such a device has an integrated format, i.e. the body structure of the device comprises an aggregation of separate parts, e.g., capillaries, joints, chambers, layers, etc., which are appropriately mated or joined together. Typically, the devices will comprise a top portion, a bottom portion, and an interior portion, wherein the interior portion substantially defines the channels and chambers of the device. The materials are generally selected for their compatibility with the full range of conditions to which the fluidic devices may be exposed, including pH, temperature, salt concentration, and application of electric fields and light fields. The device may be comprised of polymeric materials, e.g., plastics, such as polymethylmethacrylate (PMMA), polycarbonate, polytetrafluoroethylene (TEFLON.™), polyvinylchloride (PVC), polydimethylsiloxane (PDMS), polysulfone, and the like. Such devices are readily manufactured from fabricated masters, using well known molding techniques, such as injection molding, embossing or stamping, or by polymerizing the polymeric precursor material within the mold. Such polymeric substrate materials are preferred for their ease of manufacture, low cost and disposability, as well as their general inertness to most extreme reaction conditions.

The device is optionally connected to or interfaced with a processor, which controls the flow system and the optical components, e.g. micromirror array, light source etc., and stores and/or analyzes signals from trapping events. The processor in turn forwards the data to computer memory (either hard disk or RAM) from where it can be used by a software program to further analyze, print and/or display the results.

A device comprising an optical array may be used for manipulation of particles in a closed sterile field manner. Closed sterile field operation is particularly important when the array is to be used in connection with clinical procedures. The fluid pathways are closed or sealed from the environment, leading from a sample container to a container enclosing the optical array. Such a pathway can include a series of tubing conduits, filters and vessels, all of which are connected together so as to prevent exposure to the environment. Each of these containers can be configured to permit coupling to other components in order to achieve the desired separation goal and is configured to permit aseptic access. Another aspect contributing to the closed sterile field nature of the device involves providing all components that contact the target particles as sterile, non-pyrogenic, single-use components, or easily sterilized components. The optical array in the device can optionally be provided pre-loaded with a suitable medium for cells, and with such binding agents as may be utilized in a procedure. This configuration simplifies the procedure and reduces the risk of contamination.

Particles

The methods and devices of the invention may be used in the trapping, analysis and manipulation of a variety of particles. For optical trapping, the primary requirement is that the particle have a refractive index higher than that of the medium in which it is suspended. Particles may range in size, from at least about 10 nm in diameter, usually at least about 50 nm in diameter, more usually at least about 100 nm in diameter, and not more than about 500 µm in diameter, usually not more than about 250 µm in diameter, more usually not more than about 100 µm in diameter. Particles of interest are frequently in the size range of from about 1 µm, about 5 µm, or about 10 µm, to about 50 µm, or about 25 µm in diameter.

The methods of the invention may be applied to a variety of dielectric particles, within the limitations of size as indicated above, including cells, viruses, sub-cellular particles, as well as fabricated particles, e.g. silica, plastics such as polymethylmethacrylate, polycarbonate, polytetrafluoroethylene, polyvinylchloride, polydimethylsiloxane, polysulfone, etc. Fabricated particles find use as calibration controls, and as substrates for binding agents of interest, e.g. chemical libraries, binding moieties, and the like.

Where the particles are cells, the methods of the present invention can employ naturally occurring cells and cell populations, genetically engineered cell lines, cells derived from transgenic animals, etc. Virtually any cell type and size can be accommodated by matching the cell size to individual optical fiber optic core diameters and etching conditions. Suitable cells include bacterial, fungal, plant and animal cells. In one embodiment of the invention, the cells are mammalian cells, e.g. human cells; particularly complex mixtures of mammalian cells, i.e. where two or more cell types having distinguishable phenotypes are present. Examples of complex cell populations include naturally occurring tissues, for example blood, liver, pancreas, neural tissue, bone marrow, skin, and the like. Some tissues may be disrupted into a monodisperse suspension to allow isolation of a particular cell subset, such as the separation of tumor infiltrating lymphocytes from a tumor mass, the separation of islet cells from pancreatic tissue, etc. Alternatively, the complex cell population may be a cultured population, e.g. a culture derived from a complex population, or a culture derived from a single cell type where the cells have differentiated into multiple lineages, or where the cells are responding differentially to stimulus.

In one embodiment of the invention, the complex cell population comprises hematopoietic cells, for example peripheral blood, bone marrow, blood from the umbilical cord or placenta, fetal blood, leukopheresis products, etc. Of particular interest are populations comprising hematopoietic stem and progenitor cells. Other stem and progenitor cells of interest for analysis and separation include mesodermal stem and progenitor cells, neural crest stem and progenitor cells, embryonic stem and progenitor cells, liver stem and progenitor cells, pancreatic stem and progenitor cells, mesenchymal stem and progenitor cells, etc.

The particles that are being analyzed and/or manipulated may comprise specific binding members, optionally comprising an optical label, which may include fluorophores, chromophores, stains or dye compounds. The term "specific binding member" as used herein refers to a member of a specific binding pair, i.e. two molecules, usually two different molecules, where one of the molecules through chemical or physical means specifically binds to the other molecule. The complementary members of a specific binding pair are sometimes referred to as a ligand and receptor; or receptor and counter-receptor.

Binding pairs of interest include antigen and antibody specific binding pairs, peptide-MHC-antigen complexes and T cell receptor pairs, biotin and avidin or streptavidin; carbohydrates and lectins; complementary nucleotide sequences; peptide ligands and receptor; effector and receptor molecules; hormones and hormone binding protein; enzyme cofactors and enzymes; enzyme inhibitors and enzymes; and the like. The specific binding pairs may include analogs, derivatives and fragments of the original specific binding member. For example, an antibody directed to a protein antigen may also recognize peptide fragments, chemically synthesized peptidomimetics, labeled protein, derivatized protein, etc. so long as an epitope is present.

Immunological specific binding pairs include antigens and antigen specific antibodies; and T cell antigen receptors, and their cognate MHC-peptide conjugates. Suitable antigens may be haptens, proteins, peptides, carbohydrates, etc. Recombinant DNA methods or peptide synthesis may be used to produce chimeric, truncated, or single chain analogs of either member of the binding pair, where chimeric proteins may provide mixture(s) or fragment(s) thereof, or a mixture of an antibody and other specific binding members. Antibodies and T cell receptors may be monoclonal or polyclonal, and may be produced by transgenic animals, immunized animals, immortalized human or animal B-cells, cells transfected with DNA vectors encoding the antibody or T cell receptor, etc. The details of the preparation of antibodies and their suitability for use as specific binding members are well-known to those skilled in the art.

Antibodies of particular interest include those that recognize stem cells. For example, human hematopoietic stem cells may be positively selected using antibodies specific for CD34, AC-133, thy-1, SCAH-1 and SCAH-2; or negatively selected using lineage specific markers which may include glycophorin A, CD3, CD24, CD16, CD14, CD38, CD45RA, CD36, CD2, CD19, CD56, CD66a, and CD66b; T cell specific markers, tumor specific markers, etc. A number of other selective ligands are of interest, for example markers found on viruses, protozoan parasites, bacteria and other pathogens, tumor specific antigens, antigens marking progenitor cells in a variety of mammalian tissues, etc.

The binding member may be directly or indirectly labeled with an optically detectable label. Of particular interest as a label are fluorophores. Fluorescence is a physical phenomenon based upon the ability of some molecules to absorb and emit light. With some molecules, the absorption of light at specified wavelengths is followed by the emission of light from the molecule of a longer wavelength and at a lower energy state. Such emissions are called fluorescence and the emission lifetime is said to be the average period of time the molecule remains in an excited energy state before it emits light of the longer wavelength. Substances that release significant amounts of fluorescent light are termed "fluorophores". This broad class includes fluorescein isothiocyanate (FITC), fluorescein di-galactose (FDG); lissamine, rhodamine, Texas Red, phycoerythrin, allophycocyanin, 6-carboxyfluorescein (6-FAM), 2,7-dimethoxy-4,5-dichloro-6-carboxyfluorescein (6-JOE), 6-carboxy-X-rhodamine (6-ROX), 6-carboxy-2,4,4',5',7,7'-hexachlorofluorescein (6-HEX), 5-carboxyfluorescein (5-FAM) or N,N,N,N-tetramethyl-6-carboxyrhodamine (6-TAMRA); dansyl chloride; naphthylamine sulfonic acids such as 1-anilino-8-naphthalene sulfonic acid ("ANS") and 2-p-toluidinylnaphthalene-6-sulfonic acid ("TNS") and their derivatives; acridine orange; proflavin; ethidium bromide; quinacrine chloride; and the like.

Highly luminescent semiconductor quantum dots (zinc sulfide-capped cadmium selenide) have been covalently coupled to biomolecules for use in ultrasensitive biological detection (Stupp et al. (1997) *Science* 277(5330):1242-8; Chan et al., (1998) *Science* 281(5385):2016-8). Compared with conventional fluorophores, quantum dot nanocrystals have a narrow, tunable, symmetric emission spectrum and are photochemically stable (Bonadeo et al. (1998) *Science* 282 (5393):1473-6). The advantage of quantum dots is the potential for exponentially large numbers of independent readouts from a single source or sample.

Molecules such as fluorophores, which absorb light energy, do so at individual wavelengths and are characterized by a distinctive molar absorption (extinction) coefficient at that wavelength. Chemical analyses utilizing absorption spectroscopy using visible and ultraviolet light wavelengths in combination with the absorption (extinction) coefficient allow for the determination of concentration of the label present on a specific cell. The most common use of absorbance measurement is to determine concentration which is calculated in accordance with Beer's law; accordingly, at a single absorbance wavelength, the greater the quantity of the composition which absorbs light at the single wavelength, the greater the optical density for the sample. In this way, the total quantity of light absorbed is directly correlated with the quantity of the composition in the sample.

Photoactivation. As used herein, the term photoactivation is intended to encompass light induced changes in biological and chemical structures. Changes of interest include cleavage of chemical bonds, which can result in, for example, the conversion of a pro-toxin to a toxin, cleavage of a linker joining two chemical moieties, which can result in the release of a bound cell, and the like. Alternatively, chemical bonds can be formed through light activation, e.g. resulting in the crosslinking of two chemical entities. Photoactivation may also include the ablation of targeted cells, by direct light delivery, or through alterations in chemical bonds of biologically active compounds.

Photoablation. In one embodiment of the invention, the photoactivation step results in the death of the targeted cell, either through direct killing, or through activation of a photosensitive toxin. For direct killing, electromagnetic energy is converted into thermal energy that coagulates the cell. Where an optical trap is used, a second, controllable, light source is used as a source of photoablation energy, so that one light source maintains the optical trap, while the other selectively delivers the ablation beam.

Photoablation can be enhanced by the presence of a photosensitizer. A range of photosensitizing agents are known, including notably the psoralens, the porphyrins, the chlorins and the phthalocyanins. Such drugs become toxic when exposed to light. Photosensitizing agents may exert their effects by a variety of mechanisms, directly or indirectly. Certain photosensitizers become directly toxic when activated by light, whereas others act to generate toxic species, e.g. oxidizing agents such as singlet oxygen or other oxygen-derived free radicals, which are extremely destructive to cellular material and biomolecules such as lipids, proteins and nucleic acids. Psoralens are an example of directly acting photosensitizers; upon exposure to light they form adducts and cross-links between the two strands of DNA molecules, thereby inhibiting DNA synthesis. Porphyrins are naturally occurring precursors in the synthesis of heme, where protoporphyrin is an extremely potent photosensitizer. Other photoactivatable compounds include antibody conjugates to toxins, e.g. pokeweed antiviral protein, ricin, etc. that are bound through a photocleavable linker. Upon light stimulation, the linker is cleaved, thereby releasing the toxin and killing the cell (see Goldmacher et al. (1992) *Bioconjug Chem* 3(2):104-7).

Methods of Cell Analysis and Separation

A population of cells, usually a complex population of cells comprising two or more distinct sub-populations, may be applied to an optical array, where the cells are distributed is suspension. Each beam operably connected to an optical detector that collects information about the optical phenotype of each cell. Fluorescence and information about morphological changes in each cells can be monitored using the inverted microscope setup by switch between fluorescence and white light imaging. This information can then be used to selectively manipulate targeted cells, e.g. by release, attachment or ablation of individual cells present on the optical array.

The population of cells for analysis is obtained from an appropriate source, and dispersed into a single cell suspension. Various methods and devices exist for pre-separating component parts of the sample. These methods include filters, centrifuges, chromatographs, and other well-known fluid separation methods; gross separation using columns, centrifuges, filters, separation by killing of unwanted cells, separation with fluorescence activated cell sorters, separation by directly or indirectly binding cells to a ligand immobilized on a physical support, such as panning techniques, separation by column immunoadsorption, and separation using magnetic immunobeads. Alternatively, the methods of the present invention may be used for a pre-separation, or for multiple rounds of separation.

A preparation of nucleated cells may be made from the sample using a procedure that can separate nucleated cells from erythrocytes. The use of Ficoll-Paque density gradients or elutriation for such separations is well documented in the literature. Alternatively, the blood cells may be resuspended in a solution which selectively lyses erythrocytes, e.g. ammonium chloride-potassium; ammonium oxalate; etc., or whole blood may be used.

In most cases, the cells will be labeled with specific binding members, usually antibodies, in order to provide a fluorescent signal specific for one or more cell surface antigens. The cells are resuspended in staining medium, which can be any medium that maintains the viability and morphology of the cells. Various media are commercially available and may be used according to the nature of the cells, including Phosphate buffered saline, Dulbecco's Modified Eagle Medium (DMEM), Hank's Balanced Salt Solution (HBSS), Dulbecco's phosphate buffered saline (DPBS), RPMI, Iscove's medium, PBS with 5 mM EDTA, etc.

The antibodies or other specific binding members are added to the suspension of cells, and incubated for a period of time sufficient to bind the available antigens. The incubation will usually be at least about 2 minutes and usually less than about 30 minutes. It is desirable to have a sufficient concentration of antibodies in the reaction mixture so that the efficiency of the separation is not limited by lack of antibody. The appropriate concentration is determined by titration. Where the labeling is direct, the antibodies are labeled with a suitable fluorochrome. Where the labeling is indirect, a second stage antibody or label can be used, by washing and resuspending the cell suspension in medium as described above prior to incubation with the second stage antibodies.

The suspension of cells is applied to the optical array. When cell sterility is desired, the antibody incubations and washes may be performed in a closed container process, where the antibodies and wash liquids are added to a sterile container by means of a sterile syringe or similar device. In this way, contamination of the desired cells by air-borne microorganisms is minimized. In such a closed system, particularly where the container is a flexible bag, the mixing of cells and antibody may be improved by injecting a small amount of sterile air, at a ratio of from about 0.5 to 2 of air to liquid, into the container. The fluid may be any acceptable buffer system, and will be chosen to maintain the physiological integrity of the cells, preferably maximizing cell viability. Prior to adding cells to the microwell array, the end of the fiber optic array that contains the microwells may be pre-filled with medium. The suspended cells are allowed to settle into the wells.

The presence of a fluorescent label or other optical feature of the cells is determined by transmitting light at a suitable wavelength through the optical fibers or from the inverted microscope light source. The wavelength will be selected based on the fluorochromes used as a label. A series of excitation/emission pair interrogations may be performed, in order to interrogate a plurality of different fluorochromes. The returned light signals from the cells are detected and recorded at either the proximal or distal end.

The results of such analysis may be compared to results obtained from reference compounds, concentration curves, controls, etc. The comparison of results is accomplished by the use of suitable deduction protocols, AI systems, statistical comparisons, etc.

A database of phenotypic information can be compiled. These databases may include results from known cell types, references from the analysis of cells treated under particular conditions, and the like. A data matrix may be generated, where each point of the data matrix corresponds to a readout from a cell, where data for each cell may comprise readouts from multiple fluorochromes. The readout may be a mean, median or the variance or other statistically or mathematically derived value associated with the measurement. The output readout information may be further refined by direct comparison with the corresponding reference readout. The absolute values obtained for each output under identical conditions will display a variability that is inherent in live biological systems and also reflects individual cellular variability as well as the variability inherent between individuals.

Once the data is obtained from the cells, selective photoactivation or selective release of optically trapped cells is optionally utilized to separate cell populations. As described previously, the photoactivation step may cleave bound cells, bind cells to the array, or ablate undesired cells, i.e. the cells are fractionated either by altering their binding properties to the array, or by selective killing through light energy delivered through the optical fibers. After the photoactivation or selective release of optically trapped cells step, the unbound cells are washed away from the array. The medium in which the cells are released will be any medium that maintains the viability of the cells. Suitable media include phosphate buffered saline containing from 0.1 to 0.5% BSA, Dulbecco's Modified Eagle Medium (dMEM), Hank's Basic Salt Solution (HBSS), Dulbecco's phosphate buffered saline (dPBS), RPMI, Iscove's medium, PBS with 5 mM EDTA, etc., frequently supplemented with fetal calf serum, BSA, HSA, etc.

The desired cells can be the cells that are released from the array, which are then collected and used. Alternatively, where the desired cells are bound to the array, a second step is required to release the cells for collection, e.g. by release of optically trapped cells, proteolytic cleavage, competitive binding, e.g. by addition of free biotin to an avidin binding system, etc.

The separated cells may be used in a variety of ways for clinical and experimental purposes. For clinical uses, e.g. stem cell reconstitution, gene therapy, etc., the cells are administered in any physiologically acceptable medium, normally intravascularly, including intravenous although they may also be introduced into other convenient sites, where the cells may find an appropriate site for regeneration and differentiation. The cells may be introduced by injection, catheter, or the like.

The cells may be used in conjunction with a culture system in the isolation and evaluation of factors, growth potential, genetic variation, expression of genes of interest, genetic manipulation, etc.

In order to address the needs of research and clinical laboratories, a kit may be provided having the reagents and apparatus necessary to perform the subject methods. Such a kit will contain an optical fiber array, which may be provided in combination with a container, e.g. for sterile separation, and such tubing and bags as necessary for operation. A set-up may also be provided for the light source, detectors, microprocessor and software for analysis. Other components provided may be fluorescent labeling reagents, particles, instrument components, etc. While single arrays may be used, for large scale separation it is anticipated that multiple arrays may be run simultaneously, and an apparatus for automated or manual procedures may optionally be provided for such a purpose.

It is to be understood that this invention is not limited to the particular methodology, protocols, cell lines, animal species or genera, and reagents described, as such may vary. It is also to be understood that the terminology used herein is for the purpose of describing particular embodiments only, and is not intended to limit the scope of the present invention which will be limited only by the appended claims.

As used herein the singular forms "a", "and", and "the" include plural referents unless the context clearly dictates otherwise. Thus, for example, reference to "a cell" includes a plurality of such cells and reference to "the array" includes reference to one or more arrays and equivalents thereof known to those skilled in the art, and so forth. All technical and scientific terms used herein have the same meaning as commonly understood to one of ordinary skill in the art to which this invention belongs unless clearly indicated otherwise.

All publications mentioned herein are incorporated herein by reference for the purpose of describing and disclosing, for example, the cell lines, constructs, and methodologies that are described in the publications which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

The following examples are put forth so as to provide those of ordinary skill in the art with a complete disclosure and description of how to make and use the subject invention, and are not intended to limit the scope of what is regarded as the invention. Efforts have been made to ensure accuracy with respect to the numbers used (e.g. amounts, temperature, concentrations, etc.) but some experimental errors and deviations should be allowed for. Unless otherwise indicated, parts are parts by weight, molecular weight is average molecular weight, temperature is in degrees centigrade; and pressure is at or near atmospheric.

EXAMPLES

The optical system has been designed so that it can control individual traps and be integrated into a microfluidics system. In this design the primary multiple focal points matrix is formed and relayed into a specimen cell so that the entire trap formation is tied to the optical instrument and not to the specimen cell.

A simplified schematic of the optical system is provided in FIG. 1. A collimated beam of light enters a microlens array. The laser wavelength may be any from UltraViolet (UV) up to Near InfraRed (NIR). If the matrix of focal points formed by the microlens array is placed at the image plane of a microscope, it will be relayed onto an object plane. The microscope objective presents a very high NA lens, which is a necessary condition for efficient 3D trapping. The tube lens should be telecentric, which means it should present low aberrations for bundles of light that have their chief rays parallel to lens optical axis. In this case, the collimated pencils of light, formed by a lens, will cross at its focal plane. This plane is where the exit pupil of a microscope objective should be positioned for ultimate efficiency.

Converging light pencils are focused onto DMD surface. The tilting micromirrors steer them towards a Collimator/Objective set or dump them. Because of some geometry limitations, the focal points are first formed and then relayed to DMD.

Shown in FIG. 1, two light pencils are presented. All other pencils are not shown for clarity. A set of converging pencils of light under proper angle of incidence are sent towards the DMD micromirrors. Each pencil should interact with a single mirror to avoid interference in the reflected light. To achieve uniform illumination conditions, the chief (central) rays of the fiber pencils should be parallel to each other. The light is steered towards a telecentric collimator and its pupil (the place where all the pencils cross) should coincide with that of objective. As a focusing lens an Olympus (40×1.3 oil) objective is used. Because it is intended to work with a tube lens of 180 mm, providing the image size (Field Number) of 26.5 mm and the DMD width of 10.5 mm, the following collimator focal length is taken: $f=(10.5/26.5)\times180=71$ mm. The size of the objective pupil diameter is $D=2NA\times F=2NA\times(180/40)=2\times1.3\times4.5\sim12$ mm.

The NA on the collimator (and DMD) input is calculated as follows: $NA=(D/2)/f=(12/2)/71\sim0.08$. That sets another limit for the system NA (the first one was the DMD reflection geometry—which limited NA to 0.2). However, there's yet another NA limitation—related to the DMD tile size this time. If we calculate the NA which allows us to form an Airy disk of the same size as the tile for 1064 nm wavelength, we will have: $1.22\times1.064/13=0.1$. So, this is the smallest NA that will not overfill the DMD tile, and our collimator/objective system will only accept 0.08. Though we can order the collimator of 0.1 NA, the objective's pupil will be overfilled. Assuming the uniform pupil illumination, only $(0.08/0.1)^2=0.64$ power will pass through the pupil, and only about a half of it will be transmitted by the objective optical elements. We thus have only a 30% efficiency.

The set of focal points are formed by a microlens array. It is not possible to place these focal points onto the DMD surface directly, because part of reflected light pencils will be blocked by a microlens array. So we first need to form a matrix of focal points, and then relay it with an optical relay.

To switch each trap on and off individually (i.e. make them addressable), a Spatial Light Modulator (SLM) may be placed directly into the microlens array's focal plane. Individual tiles should address particular focal points.

A Digital Micromirror Device (DMD) is used for spatial modulation. A DMD is a matrix of tiny mirror tiles (13 by 13 microns), which can rotate about one of their diagonals (they all have the same orientation). For example a DMD chip may contain 1024×768 aluminum micromirrors. Their size is 13×13 μM and the pitch is 13.68 μm. The mirrors are bistable, tilting by +/−12 degrees about the axis parallel to their diagonal. There's a 2×2 μm aperture in the center of the mirror which decreases DMD efficiency. The micromirrors are placed between a relatively thick (~3 mm) glass window and ceramic plate (heatsink). As shown in FIG. 3, if the angle of incidence of the incoming ray of light is 24 degrees, the tile rotated by +12 degrees will steer the light towards optics (along the chip normal). If the tile is in −12 degrees position, the ray will not enter the optical system. That is the switching principle of the DMD. For the incident/reflected pencils of light not to overlap we have to limit the $NA=\sin 12=0,2$.

Each micromirror can stay in either a +12 or −12 position. A set of focal points formed by a microlens array is relayed onto a DMD surface so that each focal point will hit an individual DMD mirror, collect reflected light by a tube lens, and further relay it into the microscope objective. The individual DMD tiles position will define whether the optical trap is on or off.

The focal points formed by a microlens array are relayed by an Offner triplet, which consists of two concentric mirrors with a ratio of the radii equal to two—the smaller mirror (M1) is convex and the bigger mirror is concave (M2). The mirrors present very high reflection (and thus low losses—due to only three reflections) and provide very high optical performance. The Offner design is light and highly compact. With the help of an Offner relay, a set of focal points formed by the microlens array is projected onto a DMD micromirror surface (shown in FIG. 2).

Depending upon the micromirror state (+/−12), the reflected light will be further directed towards the tube lens, or beam dump. The tube lens will collimate the selected light pencils and relay them onto the microscope objective pupil. A high NA objective will convert the pencils of light crossed at its pupil, into a set of focal points at its object plane.

The NA of the Offner triplet should be larger than 0.19 due to the DMD geometry and not smaller than the Airy disk, which is defined by the DMD tile size (13 μm in this case). So the NA is preferably not smaller than:

$$NA_{DMD}=(1.22*1.064)/13 \text{ μm}=0.1(0.1<NA<0.19)$$

although an $NA_{DMD}$=0.08 may be used.

To meet 3D trapping conditions, an Olympus oil immersion objective is used, which has the following characteristics:

Magnification, M=40×
Numerical Aperture, $NA_{obj}$=1.3 (oil)
Field Number, FN=26.5

Designed Magnification is achieved with the tube lens of focal length: $F_{TL}$=180 mm.

A high NA 40× oil immersion objective (UPlanFLN 40×/1.3 Oil) is obtained from Optical Analysis Corporation. It has the highest NA for the lowest magnification (which means very broad Field Of View FOV). The distance between the two adjacent focused light spots on the DMD surface is 82.08 μm and tube lens focal length is 73.125 mm. So, the distance between the neighboring focal spots at the object side is: (4.5/73.125)*82.08=5.0 μm.

According to the sine law, the product of y*NA (where y is the dimension in lateral direction) should be constant throughout the whole optical system. We know that $NA_{obj}$=1.3 and can easily calculate Field Of View (FOV) for the objective:

$$FN/M=26.5/40=662.5 \text{ μm}.$$

Thus y*NA product equals: 662.5*1.3=0.8612.

Therefore, if we choose the NA on the DMD side be equal to 0.08, then: $y_{DMD}$=(FOV$_{obj}$*NA$_{obj}$)/NA$_{DMD}$=0.8612/0.08=10.7656 mm. This number tells us the size of the DMD that will accept the focused light bundles. In fact, the width of the (1024×768) DMD active area is:

(# of vertical mirrors+1)*DMDpitch=(768+1)*13.68=10.52 mm and these two numbers are in good agreement. Now, we will use this quantity to calculate "tube lens" focal length. We have:

$$F=(y_{DMD}/FN)*F_{TL}=(10.765625/26.5)*180=73.125 \text{ mm}.$$

This result completes the tube lens focal length calculation.

A basic system is commercially available from ASE Optics, which includes the Offner triplet, mounted to a baseplate with an enclosure, stray-light baffles, and mounting holes for a New-Focus 5-axis stage to mount to the DMD. The telecentric lens is a three-element design with a doublet and a singlet. The NA of the lenses should match the Offner triplet of 0.08. The optical relay chosen is an Offner Reflective 1:1 Relay, but also a refractive relay may be used, and the relay ratio my be different from 1:1.

The lenslet pitch is a product of the integer and the DMD pitch. Active area diameter: $y_{DMD}$=10.7656 mm should be divided by the square root of 2 to give the side of a square: 7,6122 mm. If we need 100×100 focal points matrix, we need to divide 7.6122/100=76.122 μm. This value is the distance between the focal points cast onto the DMD surface. If we further divide 76.122 by 13.68 and round it, we will get the necessary "period" of the DMD tiles. Our calculation gives: Int[5.56]=6. This means that 5 "passive" not illuminated tiles in a row or column are succeeded by one "active" illuminated one. Now we multiply 6 by 13.68 to get the DMD pitch=82.08 μm. As we use a 1:1 relay this value also presents the lenslet array pitch (and lens diameter). A suitable lenslet array is commercially available from Suss Optics, Switzerland. Len diameters much bigger than the wavelength are capable of diffraction limited operation. To eliminate astigmatism caused by any lenslet tilt (see the attached diagram), the lenses should be made elliptical (according to Suss Optics engineers). The NA for lenses should match that for the DMD and it thus should equal 0.08.

The microlens array is custom made. To get the spacing (pitch) between the microlenses one should multiply the relay ratio (1:1 in case of an Offner Relay) by an integer and the DMD micromirror pitch. In this case that will be:

LensPitch=(1:1)×N×13.68 um, where (1:1) is Offner Relay ratio, N=1, 2, 3, . . . , etc. and 13.68 microns—is the DMD distance between the two adjacent micromirrors).

Because the array normal is tilted relative to the system optical axis, the lens shape should be elliptical. Such a microlens can be readily fabricated, e.g. by Suss-Microoptics, Switzerland. The microlens array may be built refractive or reflective. In case of reflective microlens array, the lens shape should be parabolic.

Instead of one micromirror per single trap regime (which is preferable for the DMD), the system may employ of a group of adjacent mirrors per single trap.

To achieve imaging a separate, standard upright microscope (Olympus BX41) is used, equipped with a trinocular head with a camera attached to it.

The tweezer arrays are implemented within a microfluidics platform. The microfluidic chip may be fabricated of polycarbonate or polydimethylsiloxane (PDMS). After curing a PDMS negative of the PC mold, the negative is then oxidized in a solution of potassium dichromate and exposed to (heptadecafluoro-1,1,2,2-tetrahydrodecyl)trichlorosilane to produce a hydrophobic monolayer. A layer of PDMS is then cured on the negative, which can be reused (the degree to which depends on the complexity and scale of the features). A PDMS flow cell can interface with the macroscale world through a number of simple interfaces such as barbed fittings and silicon tubing to HPLC technology that can be cast directly into the polymer. Because PDMS readily adheres to glass, channel fabrication is simply a matter of temporarily or permanently affixing a microscope slide or coverslip to the open face of the flow cell. Both the polycarbonate and PDMS have decent (~85%) transmittance at 1064 nm, so we should be able to apply the microfluidics work done to date to the tweezer. With the readily available soft lithography facilities in the Boston area (Tufts, MIT, Harvard), feature scale could be reduced further by etching silicon wafers to produce master molds. The flexibility of modular microfluidic flow cellsis ideal for applications on the optical tweezer.

Experiments are performed to determine the system's capabilities and limitations. In one set of experiments, the system examines bead arrays in which microspheres are trapped and arrayed. Beads containing oligonucleotide probe sequences are arrayed and exposed to labeled targets to observe hybridization under trapping conditions. In another set of experiments, cell trapping is conducted in which bacterial cells are trapped, arrayed, and labeled. For example, different dye-antibody conjugates are delivered to cells to ascertain the ability to differentially label cells in a flow stream. This experiment demonstrates solution based tests on living cells held transiently in the traps, which platform may be employed for cell-based diagnostics applications. The cell labeling experiments also demonstrate the ability to perform analysis on many cells simultaneously followed, which platform may be employed for selecting cells exhibiting a particular labeling pattern.

What is claimed is:

1. A device for parallel trapping of multiple dielectric particles, comprising:
an optical array comprising one or more microlens arrays wherein each microlens is capable of providing for optical trapping beams; which beams are relayed through an Offner triplet to an addressible device for controlling light.

2. The device according to claim 1, wherein said light controlling device comprises a digital micromirror device comprising an array of electrostatically actuated tiltable micromirrors, wherein a beam of light is reflected by said micromirrors individually through a lens.

3. The device according to claim 1, further comprising:
a fluidics system.

4. The device according to claim 3, wherein said fluidics system comprises a fluidic channel for introduction of a sample comprising said multiple dielectric particles.

5. The device according to claim 4, wherein said fluidics system further comprises one or both of a supply vessel and a collection vessel.

6. A device according to claim 5, wherein said device is enclosed within a sealed container.

7. The device according to claim 1, further comprising a light detector operably coupled to the distal terminus of each said beam.

8. The device according to claim 7, wherein said light detector is selected from the group consisting of photomultipliers, diode arrays and charge coupled devices.

9. The device according to claim 8, further comprising a light source operably coupled to said light detector.

10. The device according to claim 8, further comprising a data processing element operably connected to said light detector.

11. A method for analysis of the optical properties of a population of dielectric particles, the method comprising:
dispersing a population of said dielectric particles on a device according to claim 1;
optically trapping said particles;
illuminating said particles;
detecting emitted light from individual particles;
wherein said emitted light is indicative of the optical properties of said individual particles.

12. The method according to claim 11, wherein said population of dielectric particles comprises cells or cellular particles.

13. The method according to claim 12, wherein said cell population is a complex population comprising two or more phenotypically distinct cells.

14. The method according to claim 11, wherein said dielectric particles comprise agents for screening.

15. The method of claim 11, wherein said optical properties comprise the presence of fluorescent labels.

16. The method of claim 15, wherein said fluorescent labels are bound to antibodies specific for cell surface molecules.

17. The method according to claim 11, further comprising the step of selectively releasing a subset of said particle population, wherein said selectivity is determined by the presence of optical properties on said particles, and wherein said releasing step comprises turning off a trapping light beam, where the trapping light beam corresponds to a one or more focal points.

18. The method of claim 17, further comprising the step of:
collecting said subset after said releasing step.

* * * * *